United States Patent [19]

Lian

[11] Patent Number: 4,945,208

[45] Date of Patent: Jul. 31, 1990

[54] CARBON DIOXIDE WELDING GUN

[76] Inventor: Jon C. Lian, No. 8-3, Chong Shang E. Rd., Dan-Shuei, Taipei County, Taiwan

[21] Appl. No.: 255,462

[22] Filed: Oct. 11, 1988

[51] Int. Cl.$^5$ ............................................. B23K 9/12
[52] U.S. Cl. ............................ 219/137.61; 219/137.44
[58] Field of Search ..................... 219/137.44, 137.52, 219/137.61

[56] References Cited

U.S. PATENT DOCUMENTS

| 3,529,128 | 9/1970 | Cruz, Jr. | 219/137.44 |
| 3,825,720 | 7/1974 | Zillinger, Jr. | 219/137.44 |
| 4,560,858 | 12/1985 | Manning | 219/137.44 |

Primary Examiner—Clifford C. Shaw
Attorney, Agent, or Firm—Morton J. Rosenberg; David I. Klein

[57] ABSTRACT

The present invention relates to an improved carbon dioxide welding gun which is equipped with a two-piece bushing machanism (50) where a welding nozzle (10) is easily detached or inserted into operative condition in an efficient manner. The two-piece bushing mechanism (50) includes a front conical head (52) and a rear conduit member (51) which are releasably secured each to the other by means of threaded sections. In this manner, the welding gun of the subject invention concept prevents accumulation of carbon residues so that the service life of the overall system is extended.

1 Claim, 5 Drawing Sheets

CARBON DIOXIDE WELDING GUN

BACKGROUND OF THE INVENTION

Field of the Invention

The subject invention system relates to an improved carbon dioxide welding gun, and more particularly to a welding nozzle which is constructed and arranged to provide a two-piece bushing which is easily and quickly removed or constructed into operative condition.

The nozzle of prior art carbon welding guns is arranged in a protective casing of the welding gun. Due to the fact that prior art nozzles utilize a flat orifice, carbon residues may accumulate around the nozzle during a welding operation. Further, high temperatures resulting from the welding operation may reduce the hardness of such prior art copper composition nozzles so that the orifice of such nozzles may be enlarged while the welding rod is penetrating through the central passage of the nozzle. Therefore, the nozzle of conventional welding guns must be replaced in a matter of hours during continuous welding operations. Due to these reasons, the nozzles of such prior art carbon dioxide welding guns are not overly practical and provide a less economical effect to the user when taken with respect to the subject invention concept system.

Still further, in the replacement of prior art nozzles, the outer protective casing must be initially detached and then the connector beyond the cable must be loosened to allow the inner welding nozzle to be removed for replacement. This is a very complicated procedure which is time consuming and increases the welding process costs.

With respect to the aforementioned inconveniences and disadvantages, the subject system provides an improved carbon dioxide welding gun which provides an efficient operation and performance criteria.

The main object of the subject invention is to provide an improved carbon dioxide welding gun which prevents accumulation of carbon residues and extends the surface life of the welding gun. Additionally, there is provided a two-piece bushing mechanism to interface with the welding nozzle so that the welding nozzle may be detached or set up into operative condition in an efficient manner.

The above and other objects, features and advantages of the present invention will be fully understood from the following description considered in connection with the accompanying drawings which illustrate the best mode of practicing the invention.

SUMMARY OF THE INVENTION

An improved carbon dioxide welding gun which comprises a front conical head member. The front conical head member has a through passage and includes an internal truncated conical configuration. A rear conduit member includes a through passage. The rear conduit member is threadedly coupled to the first conical head member. The rear conduit member has a hollow cylindrical configuration defining a first male threaded connector portion at an upper section and a second male threaded connector portion at a lower section. The second connector portion has a diameter less than the diameter of the first connector portion. There is provided a welding nozzle member having an upper conical configuration for insert into mating and interfacing relation with the internal truncated conical configuration of the front conical head member. The front conical head member has a female threaded connector for threaded securement to the first male threaded connector of the rear conduit member. The combined front conical head member and rear conduit member define a bushing mechanism whereby the welding nozzle member is easily removed or inserted for operative efficiency.

DESCRIPTION OF THE PREFERRED EMBODIMENTS

Figure 1:
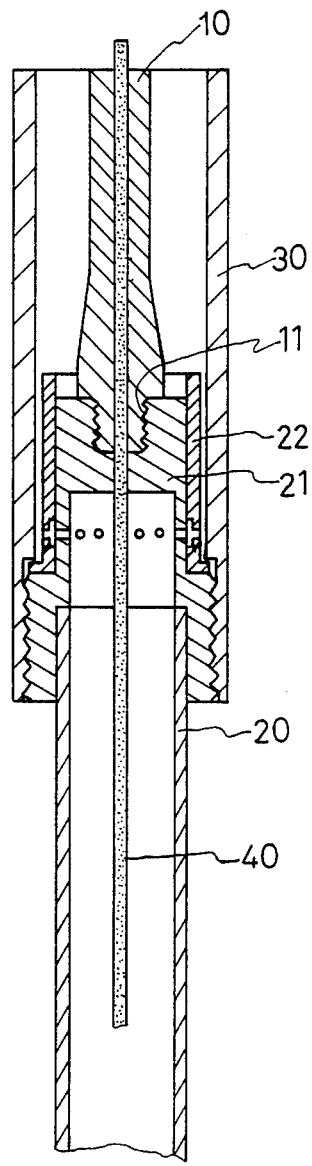
FIG. 1 is a sectional view of the prior art welding nozzle which is commonly used.

Referring now to FIG. 1, there is shown a sectional view of prior art and conventional welding nozzle type constructions. In such conventional systems, there is provided protective casing 30 which is connected to cable 20 which is initially detached. Subsequent to this type of procedure, connector 22 mounted external to current contact tube 21 on a frontal portion of cable 20 is loosened and removed. After this procedure, nozzle 10 is attached to current contact tube 21 with threaded connector 11 by means of threaded securement. Connector 22 is connected to current contact tube 21. Welding rod 40 is then inserted through a central portion of current contact tube 21 and connector 22. As is seen, nozzle 10 extends in an outward manner with respect to connector 22. Outer protective casing 30 is threaded to connect with cable 20 to complete the overall assembly of nozzle 10. In removing nozzle 10 from the overall structure, a reverse sequence is initiated which is extremely complicated and inconvenient to perform on an operational basis. Further, referring to the prior art FIG. 1, nozzle 10 is generally formed of copper when used with a conventional carbon dioxide welding gun, and is exposed inside protective casing 30. Therefore, carbon residues produced during the welding process generally stay at the surface around the orifice of nozzle 10 with a deteriorating effect to the welding process. During the welding operation, nozzle 10 of the overall welding gun is running at an extremely high temperature and welding rod 40 is being continuously fed outward through the hollow portion of nozzle 10. Thus, the orifice of nozzle 10 is gradually enlarged and interferes with the welding process with a subsequent deterioration of the surface life of the conventional welding gun.

Figures 2A, 2B:
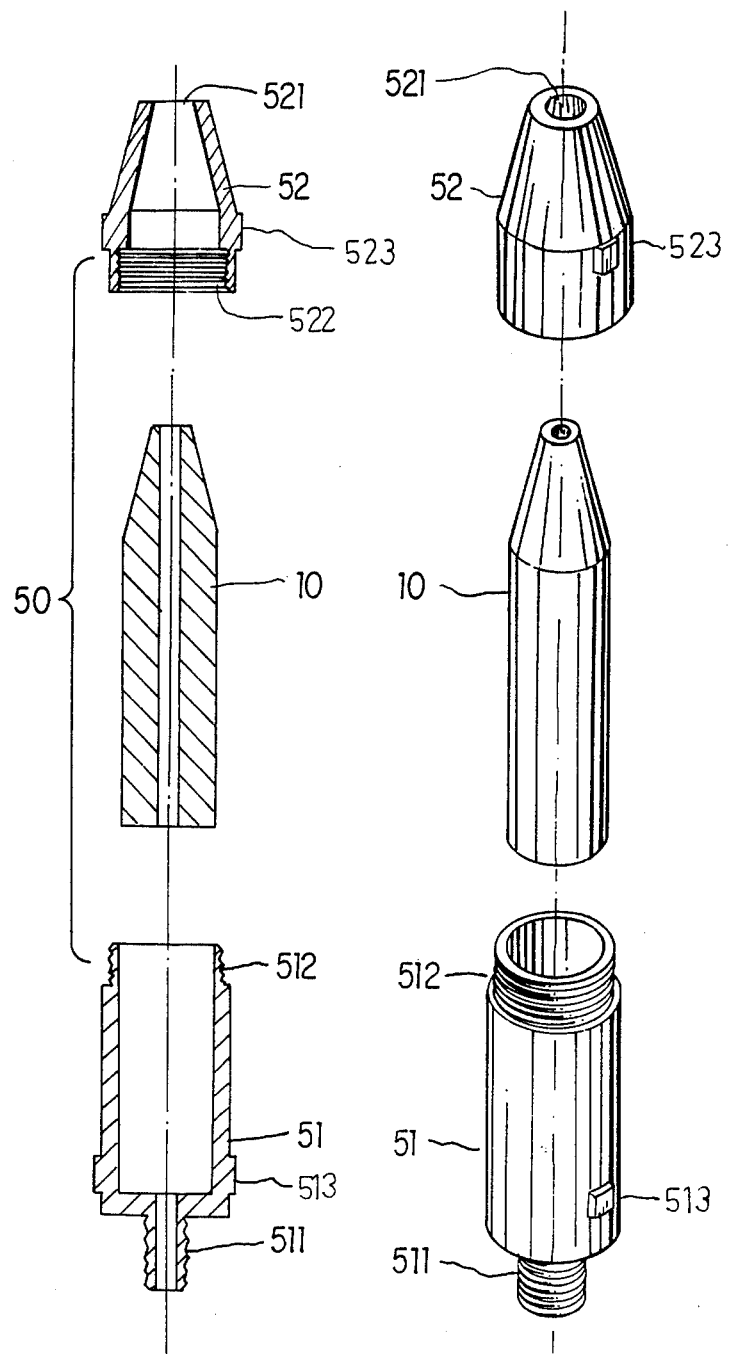
FIG. 2A and 2B are perspective and sectional views of a welding nozzle embodying the present concept.

Referring now to FIG. 2, there is shown two piece bushing mechanism 50 which has inserted therein and interfaces with contact tip 10. Two piece bushing mechanism 50 includes front conical member 52 and rear conduit member 51, each threadedly secured to the other, as will be described in following paragraphs.

Rear conduit member 51 is configured in a hollow cylindrical geometrical contour having a through passage, as is clearly seen. Rear conduit member 51 is threadedly coupled to front conical head member 52. Rear conduit member 51 includes a hollow cylindrical configuration defining first male threaded connector portion 512 at an upper section and second male threaded connector portion 511 formed at a lower section, as is seen in FIG. 2. Second connector portion 511 includes a diameter substantially less than the diameter of first connector portion 512. A pair of lug members 513 are formed on opposing sides of rear conduit member 51 at a lower portion thereof, as is seen.

Figure 3A:
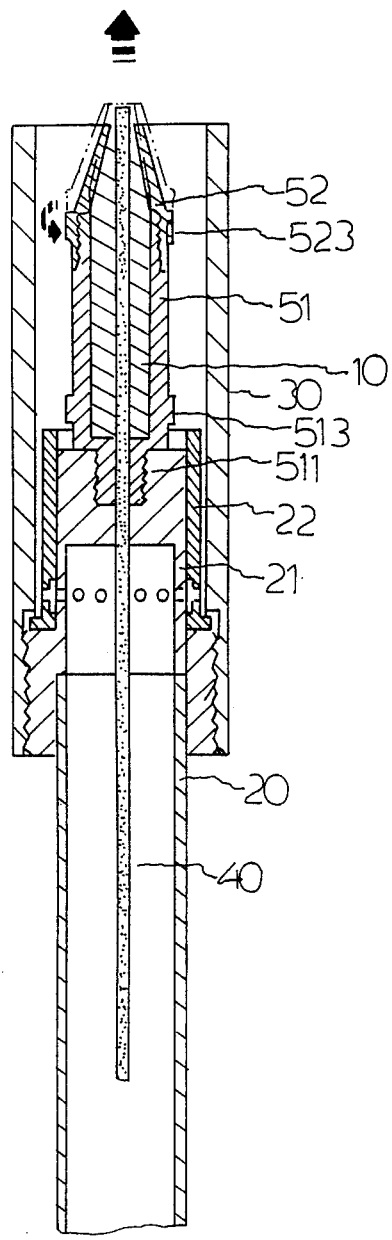
FIG. 3A is a sectional view of the subject improved welding nozzle system showing the first conical head member threadedly secured to a rear conduit member.
Figure 3B:
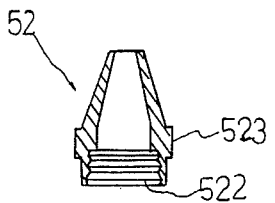
FIG. 3B is a sectional view of the subject invention system showing the first conical head member being removed from the rear conduit member; and, FIG. 4 is a sectional view of the subject system illustrating the operation during the welding process.
Figure 3B:
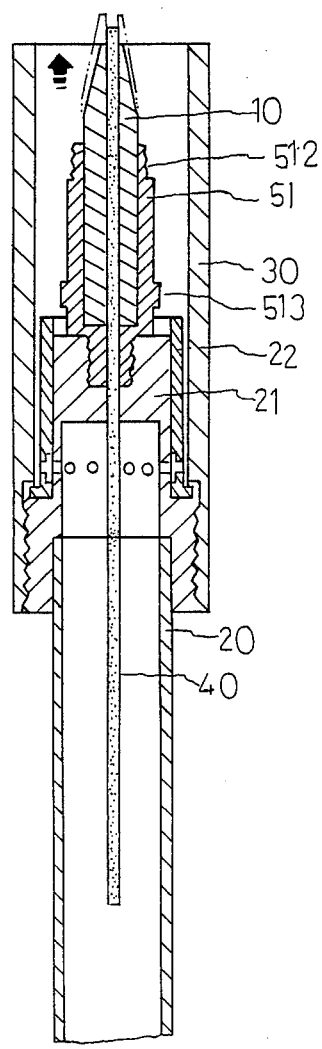

As is detailed, first male threaded connector portion 512 is threadedly securable to female threaded connector section 522 of front conical head member 52, as is seen in FIGS. 3A, 3B.

Front conical head member 52 includes a through passage and orifice 521 formed at a top section, as shown in FIG. 2. Front conical member 52 has an internal truncated conical configuration. A pair of head lug members 523 are located on opposing sides at a rear end of first conical head member 52.

Welding contact tip member 10 is insertable within rear conduit 51 and front conical head member 52. Welding contact tip member 10 includes an upper conical configuration for insert into mating and interfacing relation with the internal truncated conical configuration of first conical head member 52.

Figure 4:
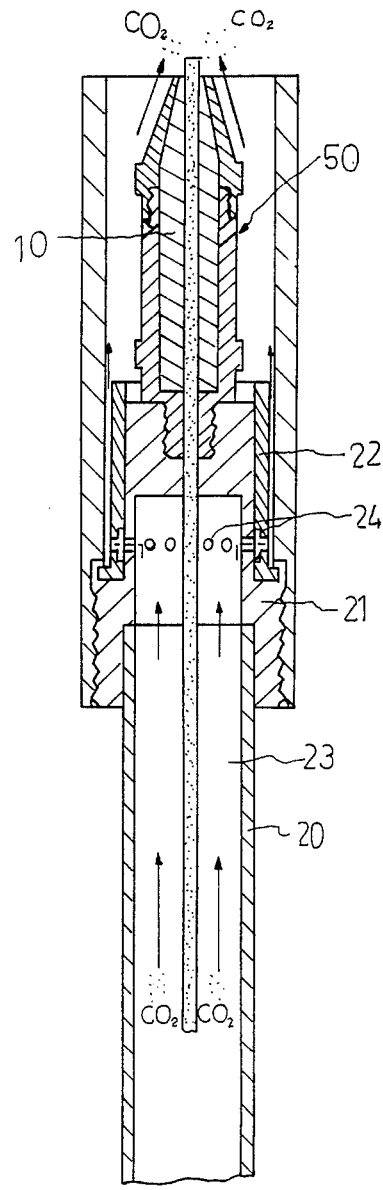

As shown in FIGS. 3A, 3B and 4, conical head member 52 is threadedly engaged to rear conduit member 51 by threaded securement of connector sections 512 and 522, as is shown.

In this manner, simple connection and detachment of the overall assembly may easily be accomplished by simple threaded securement or threaded removal of first conical member 52 and rear conduit member 51.

Referring now to FIGS. 3A, 3B and 4, the welding contact tip member 10 of the subject invention concept clearly is seen to have a smooth and continuous surface at a bottom section unlike the conventional contact tip member shown in FIG. 1, which includes a threaded connector. Initially, prior to beginning the assembly of contact tip member 10, outer protective casing 30 is removed from current contact tube 21 located in front of cable 20 in order to allow conduit 51 to be threaded with current contact tube 21 by threaded connector 511.

Connector 22 is thereafter attached to the welding gun in order to allow conduit 51 and current contact tube 21 of cable 20 to be securely coupled each to the other. Subsequent to this operation, contact tip member is inserted into the hollow space volume internal to conduit 51. Conical bushing 52 is attached to conduit 51 by threading female connector portion 522 with male connector portion 512. In a final step, outer protective casing 30 is attached to current contact tube 21 of cable 20 by means of the bottom circular groove formed in protective casing 30 to lock with connector 22 resulting in a completed assembly being formed.

Welding rod 40 penetrates through orifice 511 of contact tip 10 through the inner portion of current contact tube 21, connector 22, and conduit 51 to continuously feed welding rod 40 during the welding operation.

When the welding operation is terminated, contact tip member 10 may be replaced or removed in a simplified manner. Outer protective casing 30 does not have to be removed during this operation. Front conical head 52 of bushing mechanism 50 is detached by inserting a standard screwdriver type tool into outer protective casing 30 to pry lug members 523 in a manner such that contact tip member 10 can be removed in an efficient manner.

Referring to FIG. 4, during the welding process, carbon dioxide gas runs through inner air passage 23 of cable 20 and air holes 24 of current contact tube 21. The carbon dioxide gas passes out of the welding gun through the circular groove of connector 22. Thus, during the welding process, carbon residues produced are sprayed away. Due to the fact that bushing mechanism 50 of the present invention concept is made of a suitable steel-like material composition and the conical head 52 of the bushing mechanism 50 is chrome plated, the carbon residues do not remain near the conical head 52 of bushing mechanism 50. Thus, during the welding process, performance of contact tip member 10 of the subject welding gun is not interfered with by carbon residues and with a resulting increase in the service life of contact tip member 10.

In overall concept, the present invention concept is directed to a two-piece bushing which facilitates the assembly or detachment of contact tip member 10 in order to prevent accumulation of carbon residues and to extend the service life of a carbon dioxide welding gun.

What is claimed is:

1. In a carbon dioxide welding gun having a nozzle, the combination including:
   (a) a front conical head member, said front conical head member having a through passage, said front conical member having an internal truncated conical configuration;
   (b) a rear conduit member having a through passage, said rear conduit member being threadedly coupled to said front conical head member, said rear conduit member having a hollow cylindrical configuration defining a first male threaded connector portion at an upper section and a second male threaded connector portion at a lower section, said second connector portion having a diameter less than a diameter of said first connector portion;
   (c) a welding contact tip member located within said nozzle of said welding gun and having an upper conical configuration for insert into mating and interfacing relation with said internal truncated conical configuration of said front conical head member, said front conical head member having a female threaded connector for threaded securement to said first male threaded connector of said rear conduit member, said combined front conical head member and said rear conduit member defining a bushing whereby said welding contact tip member is easily removed or inserted for operative efficiency.

* * * * *